United States Patent [19]

Pollak-Banda et al.

[11] 4,022,083
[45] May 10, 1977

[54] DRIVE SYSTEM FOR CONNECTING TWO DRIVE SHAFTS TO A SINGLE OUTPUT SHAFT, AS IN A PROPELLER DRIVE FOR A WATERCRAFT

[75] Inventors: Erich Pollak-Banda, Augsburg; Erich John, Gersthofen, both of Germany

[73] Assignee: Fa. Zahnraederfabrik Renk AG, Augsburg, Germany

[22] Filed: Sept. 30, 1975

[21] Appl. No.: 618,060

Related U.S. Application Data

[63] Continuation of Ser. No. 450,416, March 12, 1974, abandoned.

[30] Foreign Application Priority Data

Mar. 14, 1973 Germany .......................... 2312626

[52] U.S. Cl. ........................... 74/665 B; 74/606 R; 248/19
[51] Int. Cl.² ........................................ F16H 37/06
[58] Field of Search .......... 74/665 B, 665 R, 665 P, 74/661, 665 L; 248/DIG. 1, 19, 23

[56] References Cited

UNITED STATES PATENTS

| 3,196,714 | 7/1965 | Lundstrom | 74/665 B |
| 3,369,783 | 2/1968 | Keating | 248/19 |
| 3,447,611 | 6/1969 | Larsson et al. | 74/665 L |

*Primary Examiner*—Samuel Scott
*Assistant Examiner*—Frank H. McKenzie, Jr.
*Attorney, Agent, or Firm*—Karl F. Ross; Herbert Dubno

[57] ABSTRACT

A drive system securable to a base for connecting a pair of generally parallel drive shafts to a single output shaft has a rigid nondeformable housing supported on the base by primary supports lying in a plane perpendicular to the rotation axes of pinion and drive gears rotatably carried in this housing. Each of the pinion gears is connected through a flexible coupling to one of the drive shafts and the drive gear is connected to the output shaft. The supports are deformable so that stresses which normally misalign the pinion and drive gears are compensated for outside of the housing by these supports and the drive gears remain in perfect alignment. The output shaft may extend completely through the housing and be journaled in front of the housing in a fixed bearing, and the primary supports lying in the symmetry plane of the housing may be gudgeons received in journals and permitting tipping of the housing.

8 Claims, 7 Drawing Figures

DRIVE SYSTEM FOR CONNECTING TWO DRIVE SHAFTS TO A SINGLE OUTPUT SHAFT, AS IN A PROPELLER DRIVE FOR A WATERCRAFT

This is a continuation of application Ser. No. 450,416, filed Mar. 12, 1974, now abandoned.

FIELD OF THE INVENTION

The present invention relates to drive system for connecting a plurality of drive shafts on one side to a single output shaft. More particularly this invention concerns such a transmission used for interconnecting plural drive motors on a watercraft with the single propeller shaft thereof.

BACKGROUND OF THE INVENTION

As the size of the hull of a seagoing vessel increases so does inevitably the flexibility and the elasticity of this hull. Thus in a large freighter or tanker it is possible for the one end of the hull to twist several degrees relative to the other end, and for the hull to change in overall length by a measurable distance. Such twisting and deformation is due to the considerable force exerted over the length of the hull by the sea, and the changes in length are also caused by thermal expansion and contraction.

It is known to power such a boat with a plurality of drive motors. For example it is known to use a pair of intermediate-speed Diesel engines each having a rating of 40,000 HP to drive such a boat. These engines have parallel drive shafts which are spaced apart by a distance of more than four meters. Thus if there is a change in distance between these two motors, such as caused by thermal expansion or contraction, of 0.1 percent these shafts will move four millimeters relative to each other.

As a general rule the drive shafts are each fitted with a small-diameter pinion. Both of these pinions mesh with a single large-diameter drive gear which is carried directly on the propeller shaft of the ship. Thus any displacement of the shafts relative to each other will cause the gear teeth of the pinions and of the drive gear to move out of proper mesh, thereby rapidly wearing any or all of these gears. In a common type of deformation of the drive axes of the two drive shafts no longer remain parallel, thereby twisting the pinions relative to the drive gear and rapidly damaging these gears.

OBJECTS OF THE INVENTION

It is therefore an object of the present invention to provide an improved drive system for coupling a pair of drive shafts to a driven shaft.

Another object of this invention is an improved drive for a watercraft having plural drive engines.

SUMMARY OF THE INVENTION

These objects are attained according to the present invention in a drive system for connecting a pair of generally parallel drive shafts to a single output shaft and which comprises a pair of pinions rotatable about respective parallel pinion axes and each connected through a flexible coupling to a respective one of the drive shafts. Both of these pinions mesh with a drive gear which is coupled to the output shaft and rotatable about an output axis parallel to the pinion axes. The drive gear and the two pinions are rotatably mounted on a relatively nondeformable housing which is symmetrical about a plane passing through the pinions and the gear and perpendicular to their rotation axes. At least two primary supports lie in this plane and secure the housing to the base and means is provided including a secondary support lying outside the plane for restraining tipping of the housing on the primary support. Thus it is possible for the entire housing and the gears to move limitedly, rocking about an axis lying in the symmetry plane, while the positions of the two pinions relative to the drive gear remain fixed. Thus, should one of the drive shafts move out of parallel alignment with the shaft carrying its pinions, this misalignment will not be transmitted to this pinion, leaving it in perfect mesh with the output gear. At the same time deformations of the base relative to the housing will have no effect on the positions of the gears relative to one another so that they will remain in perfect mesh under all conditions.

In accordance with further features of this invention the large output gear and the pinion gears are all formed with herringbone gearing. In this manner the rotary force that is transmitted from the pinions to the drive gear is in no way transformed into axial force effective on these elements.

In accordance with further features of this invention the housing is formed as an assembly of relatively nonbendable elements of double-wall construction. The structure carried on this housing, such as couplings and the like, is made of relatively light and bendable construction so that it will not deform the housing. Thus the various supports and connections to the drive system compensate for the various deflections and other deformations, without transmitting them to the housing.

In accordance with another feature of this invention the output driveshaft on which the ship propeller is mounted passes completely through the housing and is journaled on the side of the housing toward the drive motors in a fixed journal. This journal constitutes a secondary support for preventing tipping of the housing.

According to yet another feature of the invention the mounting shafts for the pinions are hollow and the flexible couplings for connecting these hollow shafts with the engine drive shafts are engaged inside the hollow shafts so as to permit the deflection of the internal drive shaft relative to the pinions.

BRIEF DESCRIPTION OF THE DRAWING

The above and other objects, features and advantages will become more readily apparent from the following description, reference being made to the accompanying drawing in which:

FIG. 7 is a detail view taken in the direction of arrow VII of FIG. 6.

SPECIFIC DESCRIPTION

Figure 5:
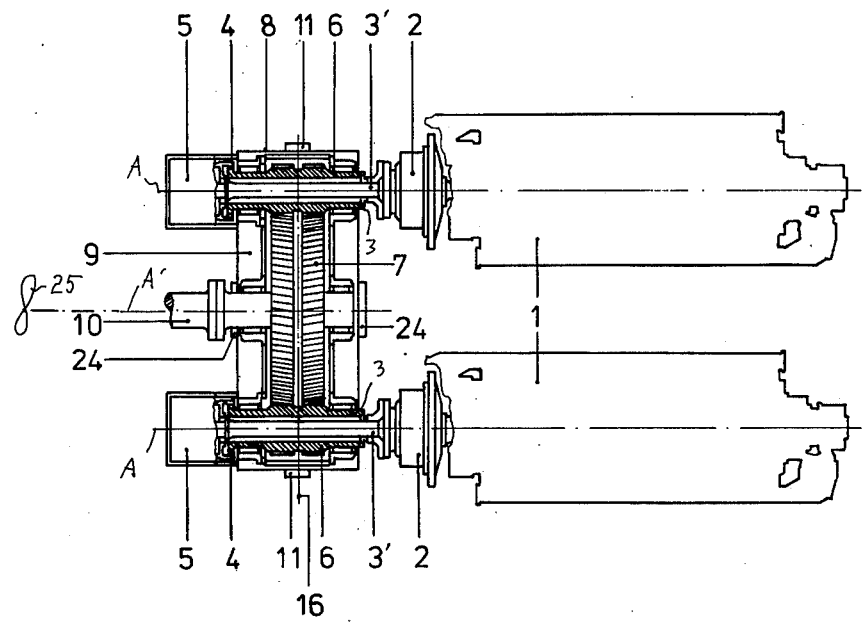
FIG. 5 is a top view of another system in accordance with this invention.
Figure 6:
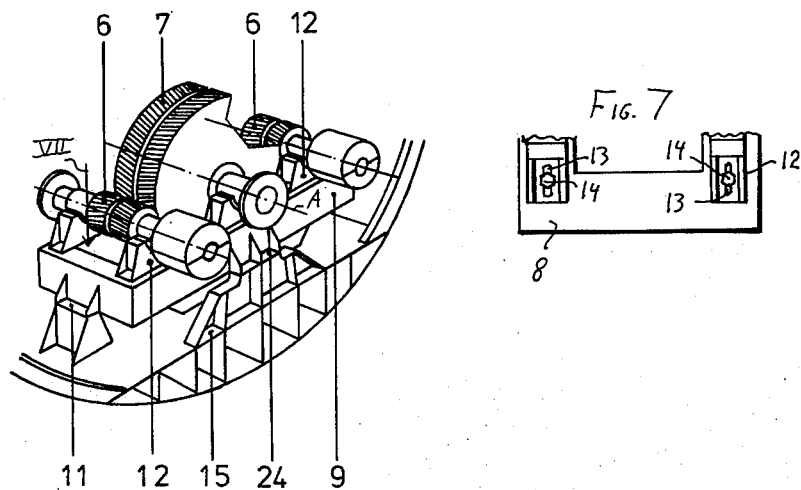
FIG. 6 is a partially broken-away perspective view of the system of FIG. 5.

As shown in FIGS. 5–7 a pair of like drive engines 1 are connected through flexible couplings 2 to core shafts 3' passing axially through hollow mounting shafts 3 on which are mounted pinions 6 formed with herringbone gearing and adapted to rotate about pinion axes A. These core shafts 3' are connected to the ends of the shafts 3' turned away from the motors by conventional double-slider couplings 4 and disk couplings 5 carried in sheet-metal casings 26. These herringbone pinions are journaled on blocks 12 formed with slots 13 through which pass bolts 14 screwed into transverse beam sections 9 of a double-wall housing 8. Thus it is possible to displace these blocks 12 transversely relative to the axes A so as to adjust the meshing of the teeth of the gears 6 with the teeth of a large-diameter output gear 7 rotatable about an axis A' parallel to and between the axes A. This output gear 7 is mounted on a support shaft 10 connected to a propeller shaft 22 carrying the propeller 25 of the ship whose lower deck is shown at 15 in FIG. 6.

The housing 8 is completely symmetrical about a plane 16 which is perpendicular to the axes A and A' and which bisects the gears 6 and 7 (vertical transverse plane through the ship hull). This housing is supported on the base 15 of the ship by two support blocks 11 which lie in the plane 16, and are bisected thereby. In addition a pair of secondary support blocks 24 are provided across the plane 16 from each other and in the middle of the front and rear sides of the housing. These supports 11 and 24 are substantially less rigid than the housing 8 so that a force exerted on the housing 8 either directly or indirectly through the shaft 10 or 3 will result in deformation of these supports rather than of the housing. Thus, should the motors 1 become misaligned, the gears 6 will nontheless remain in perfect alignment with the gear 7, since the engine misalignment will not be transmitted to them. The service life of these gears is thereby greatly increased, as well as their operating efficiency.

Figure 1:
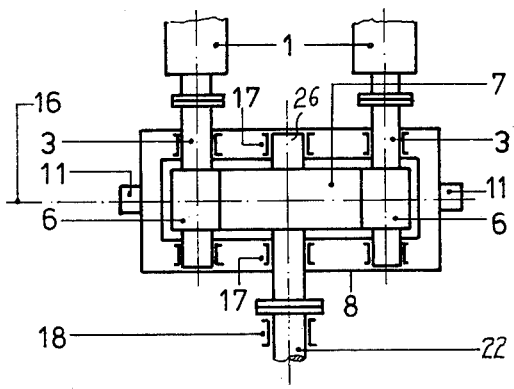
FIGS. 1–4 are schematic top views of four systems according to the present invention.

The arrangement of FIG. 1 is identical to that of FIGS. 5–7, with the journals 17 for the support shaft 10 of the gear 7 being shown. In addition the output shaft 22 is shown journaled in a fixed journal 18 externally of the housing 8.

Figure 2:
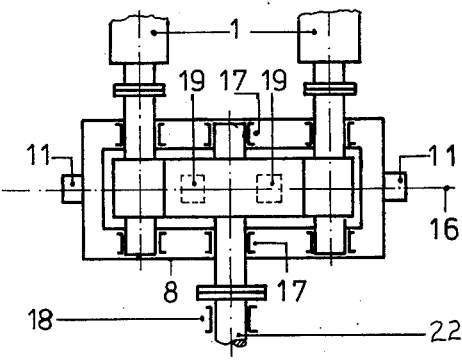

FIG. 2 shows a system wherein two addition supports 19 are provided in the plane 16, these supports 19 being between the outer supports 11.

Figure 3:
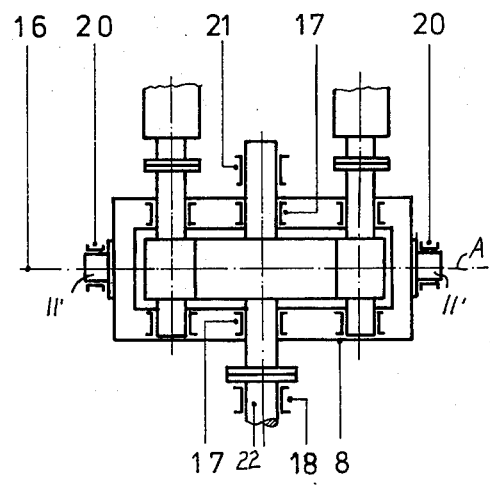

The arrangement of FIG. 3 has supports 11' located on the housing 8 in the same region as the supports 11 of FIG. 1 and formed as a pair of coaxial pins having a horizontal common axis A'' lying in the plane 16. These gudgeons 11' are received in fixed journals 20 mounted on the support constituted by the ship. In addition the shaft 20 extends completely through the housing and is received at the front side thereof in a fixed journal 21 carried on the base. The propeller shaft 22 is relatively rigidly fixed, and is not subject to considerable misaligning stresses so that this element is used to restrain tipping of the housing 8.

Figure 4:
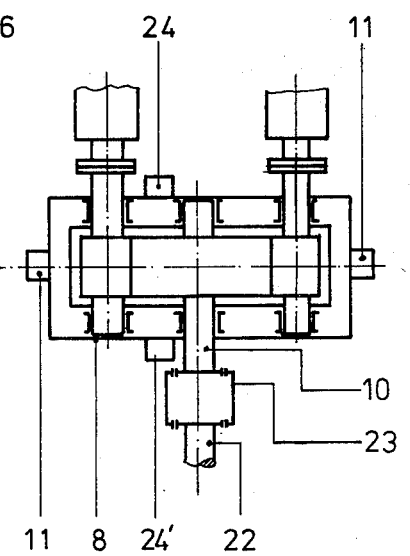

The drive shaft shown in FIG. 4 is similar to that shown in FIGS. 5 and 6, with the secondary supports 24' here offset slightly from the middles of the front and rear sides of the housing 8. In addition there is shown a flexible coupling 23, here a double sliding coupling, which connects the support shaft 10 with the shaft 22 carrying the propeller.

The drive system according to the present invention is so constructed that pinions and drive gear remain in perfect mesh at all time. Any stresses which would normally lead to deformation of the housing and/or to misalignment of these gears is compensated for externally of the housing.

We claim:

1. A drive system for connecting a pair of ship engines to a propeller shaft, said system comprising in combination:
    a housing formed of a plurality of relatively nonbendable elements forming an assembly having a pair of ends and symmetrical about a vertical plane passing through said ends, and of a plurality of relatively bendable elements;
    a support for said assembly at each of said ends thereof in said vertical plane;
    a pair of pinions spaced apart in and symmetrical about said vertical plane;
    a support for each of said pinions on said nonbendable elements of said housing;
    means for securing each of said supports for said pinions in any of a plurality of positions on said nonbendable elements of said housing;
    a drive gear supported on said nonbendable elements and symmetrical about said vertical plane, said pinions each meshing with said drive gear;
    a pair of horizontal parallel drive shafts each driven by a respective one of said engines and extending perpendicularly to said vertical plane;
    a flexible coupling between each of said pinions and a respective one of said drive shafts for transmitting only rotary motion therebetween; and
    an output shaft parallel to said drive shafts and connecting said drive gear to said propeller shaft.

2. The system defined in claim 1 wherein said nonbendable elements are double-walled.

3. The system defined in claim 2 wherein said bendable elements are made of sheet metal.

4. The system defined in claim 3, further comprising at least one secondary support for said assembly between said ends and in said vertical plane.

5. The system defined in claim 3 wherein each pinion is provided with and mounted on a tubular shaft carried by the pinion supports, each drive shaft passing longitudinally through a respective one of said tubular shafts.

6. The system defined in claim 5 wherein each flexible coupling is provided with a sheet-metal casing constituting a one of said bendable elements and is carried on said assembly to one side of said vertical plane.

7. The system defined in claim 3 wherein said means for securing said supports includes bolts threaded into said nonbendable elements, said supports for said pinions being formed with throughgoing slots through which said bolts pass.

8. The system defined in claim 3 wherein said nonbendable elements include two parallel and double-walled transverse beams to either side of said vertical plane.

* * * * *